United States Patent Office 2,794,725
Patented June 4, 1957

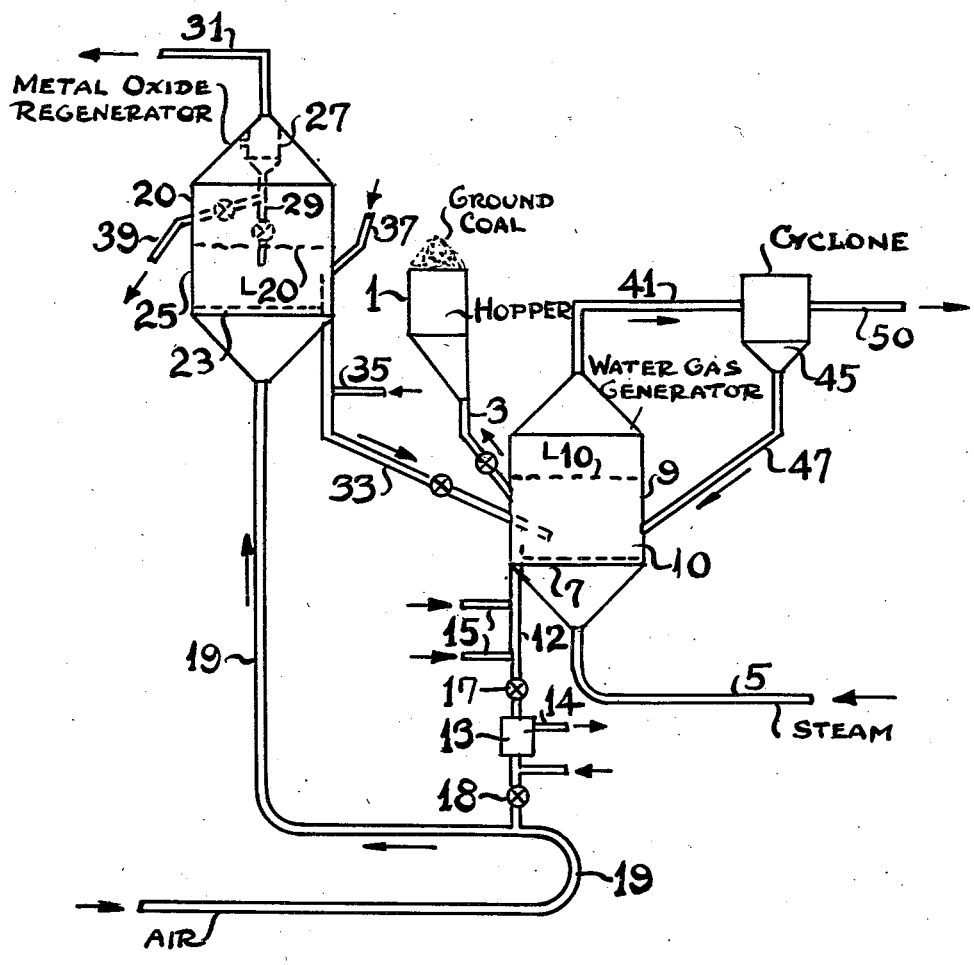
Walter G. Scharman Inventor
By P. J. Whelan Attorney

2,794,725

MANUFACTURE OF GAS MIXTURES CONTAINING CARBON MONOXIDE AND HYDROGEN

Walter G. Scharmann, Westfield, N. J., assignor to Esso Research and Engineering Company, a corporation of Delaware Application August 8, 1946, Serial No. 689,162

9 Claims. (Cl. 48—206)

The present invention relates to the manufacture of gas mixtures containing carbon monoxide and hydrogen from non-volatile carbonaceous materials such as coal, coke, peat, oil shale, heavy oil residues, cellulosic materials, including lignin, and the like, and more particularly to the manufacture of such gas mixtures as are suitable for the catalytic synthesis of hydrocarbons from carbon monoxide and hydrogen.

It has long been known that non-volatile carbonaceous materials such as coal, coke, and the like may be converted into water gas by a high temperature reaction with steam. The process yields mixtures of CO and $H_2$ in varying proportions, depending mainly on the conversion temperatures and the feed ratio of steam. The flexibility of the process may be illustrated by a series of possible chemical reactions about as follows:

$$C+2H_2O \rightarrow 2H_2+CO_2-24,700 \text{ cal.}$$
$$C+H_2O \rightarrow H_2+CO-32,500 \text{ cal.}$$
$$C+CO_2 \rightarrow 2CO-40,200 \text{ cal.}$$

The overall water gas reaction being endothermic, heat must be supplied. This is usually accomplished by the combustion of a portion of the carbonaceous feed with an oxidizing gas, such as air and/or oxygen, at about 1600°–300° F., in accordance with the following overall reactions:

$$C+O_2 \rightarrow CO_2+94,400 \text{ cal.}$$
$$2C+O_2 \rightarrow 2CO+54,200 \text{ cal.}$$

The combustion reaction may be carried out either simultaneously with the water gas reaction or alternately in a make and blow fashion.

It will be appreciated from the above that the water gas process permits the production of gas mixtures of varying composition and B. t. u. content. Furthermore, the process as such is extremely well suited not only for the production of fuel gases but also for the production of feed gases for hydrogenation processes and particularly for the catalytic synthesis of hydrocarbons and/or oxygenated organic compounds from CO and $H_2$. Depending on the products desired, the latter synthesis requires $H_2$:CO ratios varying within the wide limits of 0.5–5 volumes of $H_2$ per volume of CO.

However, the technical utilization of the water gas process, particularly for hydrogenation processes and the production of synthesis feed gas, has been appreciably impeded by difficulties encountered in heat supply and continuous operation as well as in the substantial removal of sulfur compounds from the gas, the latter being imperative for the utilization of the gas in the hydrocarbon synthesis.

The problem of supplying heat of reaction with continuity of operation has been materially eased by the application of the so-called fluid solids technique wherein the carbonaceous charge is reacted in the form of a dense turbulent mass of finely-divided solids fluidized by the gaseous reactants and products. In this procedure heat is supplied to the gas generator by the combustion of carbonaceous constituents of the charge with air and/or oxygen either in the gas generator itself or in a separate heater from which it is transferred to the gas generator as sensible heat of hot combustion residue.

The procedure involving combustion within the gas generator requires the use of highly expensive pure oxygen as the oxidizing gas in order to prevent dilution of the product gas with nitrogen. When a separate heater is used, considerable loss of potential heat is incurred as a result of high carbon concentrations in the heater requiring greater quantities of air to provide the necessary heat for water gas generation at heater temperatures of about 1800°–2200° F. Moreover, the sensible heat of the combustion residue being the only heat source for the water gas reaction, the solids circulation rates from the heater to the gas generator are quite considerable, i. e. usually around 4 lbs. or 0.2 cu. ft. of solids per cu. ft. of water gas produced. In either case, the water gas produced contains organic sulfur compounds which complicate considerably the gas desulfurization. Finally, the steam and cooling water requirements are relatively high. These difficulties result in a relatively high cost of water gas or synthesis gas from coal, averaging more than $.10 per 1,000 cu. ft. of gas produced as compared with about $.05 per 1,000 cu. ft. of synthesis gas produced by modern methane conversion processes.

The present invention overcomes the aforementioned difficulties and affords various additional advantages. These advantages, the nature of the invention and the manner in which it is carried out will be fully understood from the following description thereof read with reference to the accompanying drawing.

It is, therefore, the principal object of my invention to provide an improved process for the production of gas mixtures containing carbon monoxide and hydrogen from non-volatile carbonaceous materials.

Another object of my invention is to provide improved means for converting carbonaceous materials into gas mixtures suitable for the catalytic synthesis of hydrocarbons from carbon monoxide and hydrogen.

A more specific object of my invention is to provide improved means for supplying heat to a water gas generator using a carbonaceous charge in the form of a dense fluidized mass of finely divided solids.

Other and further objects will appear hereinafter.

In accordance with the present invention the gasification of solid carbonaceous materials with steam is carried out in the presence of a solid oxygen carrier such as metal oxides supplying the heat required. Employing the fluid solids technique the fluidized finely divided oxygen carrier is intimately contacted with, and gives off its oxygen to the fluidized solid carbonaceous charge of the gas generator. The resulting combustion which may go in part to $CO_2$ may generate at least a substantial portion of the heat required by the water gas reaction. In addition, the metal oxide is reduced so that it may be reoxidized in an exothermic reaction to produce heat required by the gasification reaction. Low oxygen material such as reduced metal oxide may be continuously or intermittently withdrawn from the gas generator together with the solid gasification residue of the carbonaceous feed.

The withdrawn reduced metal oxide, preferably after separation from solid gasification residue by any suitable means such as flotation or, in the case of magnetic metals, by magnetic separation, or the like, may be circulated to a separate oxidation zone to be regenerated by oxidation with air at temperatures within the range of about 1400° to 2500° F. Regenerated metal oxide may be returned to the gas generation zone substantially at the temperature of the oxidation zone thus supplying sensible heat of solids to the gas generation zone in addition to any heat generated by combustion within the gas generation zone.

In this manner, the volume of solids to be circulated through the system for the purpose of heat supply may be reduced in some instances to less than that required for the steam-carbon reaction when carried out in the absence of metal oxides. In addition, air, rather than pure oxygen, may be used for heat generation. It should be noted that, as indicated above, in the system in which a separate heater is used and hot ashes from the heater supply the heat for the water gas reaction, the carbon concentration in the heater must be low in order to prevent excessive carbon monoxide formation therein. To accomplish this it has been necessary to operate the water gas generator likewise at a relatively low carbon concentration which results in a low rate of the water gas reaction. In accordance with my invention the necessity of low carbon concentration in a heater is obviated and the water gas generator may be operated at highest carbon concentrations and rates of reaction. Moreover, the metal oxide may act simultaneously as a cracking catalyst for organic sulfur compounds, thus simplifying the desulfurization of the product gas. In addition, it may catalyze the water gas shift reaction, thereby allowing the production of larger proportions of $H_2$ by reaction of CO with steam, the supply of the latter being controlled, if necessary, to establish concentrations suitable for high $H_2$ content at equilibrium, toward which the catalytic effect is directed. On the other hand, any methane formed by cracking of the carbonaceous feed is more easily reformed in the presence of metals such as iron, nickel, etc.

The metal oxides which may be used in the present process are quite generally such oxides as are capable of oxidizing carbonaceous constituents of the solid carbonaceous charge at the temperatures and pressures of the water gas reaction. While certain oxides which are reduced to metals such as ferrous oxide, cuprous oxide, and the like, are useful for my process, other suitable oxides are the higher oxides of metals which are capable of forming both higher and lower oxides. Typical of these are cupric oxide, ferric oxide and vanadium pentoxide. Suitable also are mixtures of these oxides and mixtures with carrier materials such as kieselguhr, alumina or silica gels, bentonites, and the like.

Having set forth the general nature and objects, the invention will be best understood from the more detailed description hereinafter, in which reference will be made to the accompanying drawing which shows a semi-diagrammatic view of apparatus suitable to practice a preferred embodiment of the invention.

Referring now in detail to the drawing the system illustrated therein essentially comprises a water gas generator 10 and a metal oxide regenerator 20, the functions and cooperation of which will be presently explained. For the purpose of the following description, the carbonaceous charge will be referred to as coal, but other materials may be used.

Coal ground to a fluidizable particle size, for example, of the order of 50% having a size of less than 100 mesh is fed, preferably continuously, from feed hopper 1 through line 3 which may have the form of an aerated standpipe, to water gas generator 10. Steam which, particularly during the starting period, may be preheated to temperatures of about 1200°–1600° F., is supplied through line 5 to the bottom portion of generator 10 and passes through a distribution grid 7 into gas generation zone 9 to react with the coal at a temperature of between 1400° and 2400° F., preferably about 1600° to 1800° F. whereby water gas is formed. About 0.5 to 3.0 lbs. of steam per lb. of coal to be gasified is generally sufficient for this purpose, although if high CO gas is desired, steam addition may be dispensed with, except as required for fluidization, gasification being accomplished by the $CO_2$ and steam formed by oxidation of part of the coal.

Gas generation zone 9 also contains finely divided metal oxide of a particle size similar to that of the coal, which is supplied from metal oxide regenerator 20 as will appear more clearly hereinafter. The amounts of metal oxide required to supply the desired amount of oxygen to support a heat-generating combustion in generator 10 vary between about 1 and 25 lbs., preferably about 2–10 lbs., per lb. of coal to be gasified, depending on the character of the metal oxide and the coal or other carbonaceous solid used, the amount of inert material circulating, and the temperature desired in generator 10. However, this amount is preferably not less than that which gives up about 7–8 cu. ft. of oxygen (measured at standard conditions) per lb. of coal charged (on an ash and moisture-free basis).

The linear velocity of the steam is so selected that the charge of gas generation zone 9 forms a dense ebullient mass of fluidized solids having a well defined upper level $L_{10}$. Steam velocities of about 0.5–10 ft. per second, preferably 1–4 ft. per second are suitable for this purpose.

Spent oxide and solid gasification residue are withdrawn from the bottom of zone 9 and passed downwardly through standpipe 12 aerated through taps 15 by small amounts of a suitable fluidizing gas such as air and/or flue gas, and under some conditions steam, and provided with a slide valve 17. This fluidizing gas may be added in sufficient quantities to strip the spent oxide of occluded water gas.

The spent fluidized metal mass and gasification residue are passed through a classification zone schematically indicated at 13 from which gasification residue is taken overhead through line 14 and metal mass is passed through an aerated standpipe 18 into pipe 19 wherein it is picked up by air to form a dilute suspension which is passed to the lower portion of metal oxide regenerator 20 and through distributing grid 23 into oxidizing zone 25.

The linear velocity of the air supplied to regenerator 20 is so selected that a dense turbulent mass of fluidized solids having an upper level $L_{20}$ is formed above grid 23. Sufficient air must be charged to permit reoxidation of the metal mass at the rate prescribed by the heat requirement of gasification zone 9. In general, 40 to 130 cu. ft. of air per pound of coal to be gasified is sufficient for this purpose.

The oxidation temperature in zone 25 is maintained between 1500° and 2500° F., preferably between about 1700° and 1900° F. by a proper control of the air supply. Residual air consisting essentially of nitrogen and small proportions of $CO_2$ is withdrawn overhead through a conventional gas-solids separator 27 provided with solids return pipe 29, and through line 31 to be either vented or passed to any desired use such as aeration of standpipe 12 or nitrogen recovery. If desired, cyclone separator 27 may be located downstream of means for cooling the flue gases.

Regenerated oxidized metal is withdrawn downwardly from regenerator 20 and passed substantially at the temperature of zone 25 through a standpipe 33, aerated and stripped with steam through taps 35, into gas generation zone 9 of generator 10. The rate of metal oxide circulation through pipe 33 may vary within wide limits depending on the metal oxide and carbonaceous solid used and the desired temperature gradient between zones 9 and 25. It should, however, be sufficient to make about 0.01 to .05 mols of $O_2$ available in zone 9 per lb. of carbon to be gasified. In the case of copper oxide and a common bituminous coal the solids circulation through pipe 33 may be about 1 to 25 lbs., preferably about 5–10 lbs. or 0.02–0.07 cu. ft. per cu. ft. of water gas produced.

Fresh metal oxide may be supplied to regenerator 20 through line 37 and metal oxide fines of undesirably small size may be withdrawn from the system through line 39.

Returning now to gas generator 10, product gas consisting essentially of CO and H₂ and small amounts not exceeding about 5–15% of CO₂ and containing entrained coal ash together with a small amount of unconverted coal and metal or metal oxide is withdrawn through line 41 and passed to a conventional gas-solids separator 45, preferably of the centrifugal type, wherein the entrained solids are separated and, if desired, returned through line 47 to gas generator 10. The gas, substantially free of solids, passes through line 50 to conventional gas purification equipment (not shown) and ultimately to a synthesis reactor or other use.

If desired, tail gas from the hydrocarbon synthesis may be recycled to generator 10, for example, via steam feed line 5 in order to modify the composition of the water gas produced by the conversion of the gaseous hydrocarbons and CO₂ contained in the tail gas.

While no specific pressures have been mentioned above it should be understood that pressures varying from slightly sub-atmospheric to about 400 lbs. per sq. in. gauge may be applied. If high B. t. u. fuel gas of increased methane content is desired, pressures of at least 200 lbs. per sq. in. are preferred.

It should be understood that instead of reoxidizing and recirculating the metal mass withdrawn through pipe 12, it may be discarded from the process together with the ashes and put to any suitable use. In this case, fresh metal oxide is continuously or intermittently fed together with the carbonaceous charge through feed hopper 1, as required, and the total solids feed is preheated to temperatures between about 1000°–1900° F. Partly in heat exchange with solid and/or gaseous gasification products in any manner obvious to those skilled in the art.

It will be appreciated from the above description that the system illustrated in the drawing permits a fully continuous conversion of carbonaceous solids into a mixture of carbon monoxide and hydrogen of improved purity, affords improved heat economy and reduces solids circulation.

While the foregoing description and exemplary operations have served to illustrate specific applications and results of my invention, other modifications obvious to those skilled in the art are within the scope of the invention. Only such limitations should be imposed on my invention as are indicated in the appended claims.

I claim:

1. The process of producing carbon monoxide and hydrogen which comprises contacting a dense fluidized bed of finely-divided carbonaceous solids with steam at gasification temperatures, adding to said bed a finely-divided metal oxide adapted to oxidize carbonaceous materials at gasification conditions, withdrawing finely-divided solid carbonaceous gasification residue and reduced metal oxide from said bed, separating substantially completely said reduced metal oxide from said solids carbonaceous gasification residue, conducting the reduced metal oxide to a regeneration zone, treating it in air while in the form of a fluidized bed to re-oxidize said reduced metal oxide and returning re-oxidized metal oxide to the fluidized bed of carbonaceous solids at a temperature substantially higher than that prevailing in said bed of fluidized carbonaceous solids.

2. The process as claimed in claim 1 wherein the amount of metal oxide added to said bed is sufficient to support an oxidation reaction liberating at least a substantial portion of the heat required by the gasification reaction between steam and carbonaceous solids.

3. The process as claimed in claim 1 wherein said withdrawn metal oxide is reoxidized in the form of a dense turbulent mass of finely divided fluidized solids.

4. The process of producing carbon monoxide and hydrogen which comprises passing steam upwardly through a dense fluidized bed of finely divided carbonaceous solids of fluidizable particle size maintained at gasification conditions of temperature and pressure conducive to the formation of a gas containing carbon monoxide and hydrogen and of a solid carbonaceous gasification residue, in the presence of fluidizable particles of a heavy metal oxide adapted to cause oxidation of carbonaceous materials at said gasification conditions, said metal oxide being present in amounts sufficient to supply at least a substantial portion of the heat required to maintain said gasification temperature, withdrawing a gas containing carbon monoxide and hydrogen upwardly from said bed, withdrawing finely divided metal oxide of reduced oxygen content and solid carbonaceous gasification residue downwardly from said bed, separating withdrawn metal oxide from solid carbonaceous gasification residue, passing separated metal oxide to a dense fluidized bed of finely divided metal oxide, passing air upwardly through said second named bed at conditions adapted to reoxidize said withdrawn metal oxide, and returning reoxidized metal oxide from said second named bed to said first named bed.

5. The process as claimed in claim 4 wherein said first named bed is maintained at a temperature of about 1600° to 1800° F. and said second named bed at a higher temperature of about 1700° to 1900° F. and said reoxidized metal oxide is returned to said first named bed substantially at said higher temperature.

6. The process as claimed in claim 4 wherein said metal oxide is selected from the group consisting of oxides of iron and copper.

7. The process as claimed in claim 4 wherein said gasification pressure is at least 200 lbs. per sq. in.

8. A process for the gasification of solid carbon-containing material which comprises introducing finely-divided reducible metal oxide selected from at least one of the group consisting of the oxides of iron, vanadium, and copper and solid carbon-containing material into a reaction zone, suspending such finely-divided reducible metal oxide and said solid carbon-containing material in a gasiform fluid substantially free from free oxygen passing through said reaction zone, maintaining said reaction zone under endothermic conditions and at a temperature such that carbon is oxidized to carbon monoxide as the principal reaction by reduction of said metal oxide, withdrawing from said reaction zone reduced metal oxide, reoxidizing by contact with free oxygen said withdrawn reduced metal oxide under exothermic conditions and at a higher temperature than maintained in said reaction zone, reintroducing the reoxidized metal oxide into said reaction zone at a temperature above the temperature level maintained therein such that heat is supplied to said reaction zone thereby, and withdrawing from said reaction zone an effluent comprising carbon monoxide as a product of process, said reducible metal oxide being the principal source of oxygen for the oxidation of carbon to carbon monoxide.

9. A process for the gasification of solid carbon-containing material which comprises contacting a finely-divided reducible metal oxide selected from at least one of the group consisting of the oxides of iron, vanadium, and copper with a finely-divided solid carbon-containing material in a reaction zone, suspending the mass of finely-divided reducible metal oxide and solid carbon-containing material in a gasiform fluid substantially free from free oxygen in said reaction zone, maintaining said reaction zone during contact between reducible metal oxide and carbon-containing material under endothermic conditions and at a temperature such that carbon is oxidized to carbon monoxide as the principal reaction by reduction of said metal oxide, thereafter reoxidizing reduced metal oxide by contact with free oxygen under exothermic conditions at a higher temperature for re-use in the reaction in which carbon is oxidized to carbon monoxide and to supply heat thereto, and recovering from said reaction zone an effluent comprising carbon monoxide as a product of the process, said reducible metal oxide being the principal source of oxygen for the oxidation of carbon to carbon monoxide.

References Cited in the file of this patent

UNITED STATES PATENTS

| | | |
|---|---|---|
| 1,857,799 | Winkler | May 10, 1932 |
| 2,425,754 | Murphree et al. | Aug. 19, 1947 |
| 2,436,938 | Scharmann et al. | Mar. 2, 1948 |
| 2,482,187 | Johnson | Sept. 20, 1949 |

FOREIGN PATENTS

| | | |
|---|---|---|
| 8,239 of 1899 | Great Britain | Mar. 10, 1900 |

OTHER REFERENCES

Getman et al.: "Outlines of Theoretical Chemistry," 5th edition, pages 250–251.